United States Patent
Swann et al.

(10) Patent No.: US 7,611,286 B2
(45) Date of Patent: Nov. 3, 2009

(54) JOURNAL BEARING ARRANGEMENT

(75) Inventors: Michael K. Swann, Gales Ferry, CT (US); Nigel Henry New, Harrow (GB)

(73) Assignee: Delaware Capital Formation, Inc., Wilmington, DE (US)

(*) Notice: Subject to any disclaimer, the term of this patent is extended or adjusted under 35 U.S.C. 154(b) by 127 days.

(21) Appl. No.: 11/959,248

(22) Filed: Dec. 18, 2007

(65) Prior Publication Data

US 2008/0095482 A1    Apr. 24, 2008

Related U.S. Application Data

(62) Division of application No. 10/479,583, filed on Jun. 16, 2004, now Pat. No. 7,367,713.

(51) Int. Cl.
 *F16C 23/04* (2006.01)
 *F16C 17/03* (2006.01)
 *F16C 27/00* (2006.01)
(52) U.S. Cl. .................. 384/312; 384/119; 384/192; 384/308; 384/215
(58) Field of Classification Search ................ 384/107, 384/117–119, 173, 192, 215, 308–312, 316–317, 384/626
See application file for complete search history.

(56) References Cited

U.S. PATENT DOCUMENTS

| | | | | |
|---|---|---|---|---|
| 2,173,125 | A * | 9/1939 | Miller | 384/173 |
| 3,004,804 | A * | 10/1961 | Pinkus et al. | 384/311 |
| 3,497,276 | A * | 2/1970 | Tessarzik et al. | 384/312 |
| 3,791,703 | A * | 2/1974 | Ifield | 384/117 |
| 3,985,405 | A * | 10/1976 | Okano et al. | 384/117 |
| 4,300,808 | A * | 11/1981 | Yoshioka | 384/312 |
| 4,381,128 | A * | 4/1983 | Vohr | 384/154 |
| 4,460,283 | A * | 7/1984 | Yoshioka et al. | 384/215 |
| 4,568,204 | A * | 2/1986 | Chambers | 384/152 |
| 4,600,317 | A * | 7/1986 | Mori | 384/312 |
| 4,627,746 | A * | 12/1986 | Grisel et al. | 384/119 |
| 4,668,108 | A * | 5/1987 | McHugh | 384/215 |
| 4,714,357 | A * | 12/1987 | Groth et al. | 384/312 |
| 4,913,563 | A * | 4/1990 | Veronesi et al. | 384/312 |
| 5,288,153 | A * | 2/1994 | Gardner | 384/311 |
| 5,421,655 | A * | 6/1995 | Ide et al. | 384/99 |
| 5,518,321 | A * | 5/1996 | Hata | 384/316 |
| 5,743,654 | A * | 4/1998 | Ide et al. | 384/311 |
| 5,743,657 | A * | 4/1998 | O'Reilly et al. | 384/312 |
| 6,623,164 | B1 * | 9/2003 | Gozdawa | 384/119 |

FOREIGN PATENT DOCUMENTS

JP            60249720 A  * 12/1985

* cited by examiner

*Primary Examiner*—Marcus Charles
(74) *Attorney, Agent, or Firm*—Foley & Lardner LLP (57) ABSTRACT

A tilting pad journal bearing, an annular housing for an array of arcuate bearing pads resiliently mounted by spring means which biases the pads against heads of restraining bosses that limit radial displacement and cause the bearing pads to define a shaft space. The pads have associated therewith support pegs secured to housing or pad at one end and movable relative to the pad or housing at the other, and the spring means comprises stacks of individually deflectable elements mounted between relatively moving pad, housing or peg and pre-loaded by adjusting the effective gap with the pads against the bosses. Relative movement between springs provide friction damping. The restraining bosses may be displaceable together to eliminate the shaft space clearance if the magnetic suspension fails or shows signs of failing.

10 Claims, 7 Drawing Sheets

JOURNAL BEARING ARRANGEMENT

CROSS REFERENCE TO RELATED APPLICATIONS

This application is a divisional application of prior application Ser. No. 10/479,583, filed Jun. 16, 2004, which has a U.S. Pat. No. 7,367,713, and claims benefit to International Application No. PCT/GB02/02399 filed on Jun. 6, 2002 and published in English under PCT (Article 21(2)); British Application No. GB0115336.0 filed Jun. 22, 2001; and U.S. Provisional Application No. 60/296,345, filed Jun. 6, 2001, all of which are incorporated herein in their entirety by these references.

BACKGROUND

This invention relates to journal bearings for rotating shafts and in particular to bearings which are arranged to support heavy and rapidly rotating shafts in circumstances when abnormal operating conditions may result in uneven contact between their surfaces.

The invention is particularly, but not exclusively, concerned with journal bearings that form a back-up bearing arrangement in which a shaft surface, or a rotating bearing component carried thereon, normally rotates relative to, but spaced from, a stationary part except in circumstances where the means of supporting the shaft with its normal spacing is removed, accidentally or deliberately, or when an external shock or internal out-of-balance imposes loading on the shaft beyond the control of the normal suspension means.

In such circumstances, direct contact between the relatively moving or stationary parts may set up oscillations which prolong and/or effect magnification of the initial impact loading and cause damage to either or both surfaces.

When such contact inevitably leads to stopping rotation of the shaft, direct contact and any resultant damage may be acceptable insofar as bearing surfaces may be replaceable before operation is resumed. However, where impact occurs during shaft rotation without intentional interruption thereof such impact may create such loss of controlled rotation and damage as to require in any event, stopping of the shaft and refurbishment of the bearing.

SUMMARY

It is known generally within such journal bearings to mount the (preferably) stationary part resiliently so as to accommodate shaft displacing shock forces and/or the weight of the shaft, but in large machines the provision of such resilience introduces further problems, including those resulting from insufficient space for the displacement associated with the ability to support loading exerted by such a shaft or match resilience to the operating conditions without magnifying rotation eccentricity of a shaft to the point of resonance.

Such problems occur not only with back-up bearings, which function only after the shaft has departed from a normal suspended position, but also with what may be regarded as a primary support bearings which normally operate in contact with the shaft or separated therefrom by a lubricating film. Avoidance of excessive stresses from external impact loading or rotation eccentricity by resilient mounting may likewise result in overloading the resilient mounting or other bearing components if adequate space is not available for additional structural demands.

It is an object of the present invention to provide for a rotatable shaft a journal bearing arrangement which mitigates many of the construction and operating problems associated with unusual levels of loading resulting from eccentric rotation of such shaft. It is also an object of the present invention to provide such a journal bearing arrangement as a primary bearing or a back-up journal bearing arrangement for a separately borne shaft.

According to a first aspect of the present invention a journal bearing arrangement for a rotatable shaft comprises
  (i) housing means arranged to surround a shaft space and having a housing surface facing into the shaft space
  (ii) a plurality of arcuate bearing pads arrayed about the shaft space overlying the housing surface, each having a bearing face adjacent the shaft space and a body face adjacent the housing surface, and
  (iii) mounting means, arranged to support at least one bearing pad with respect to the housing surface movable relative thereto in a direction to and from the housing surface, including associated with each said movable pad stop means operable to limit the extent of pad movement away from the housing surface, and spring means, operable to bias the pad away from the housing surface to the limit imposed by the stop means and exert on said stopped pad a predetermined level of pre-load and, in response to load applied to the bearing surface exceeding said pre-load level, permit displacement of the pad towards the housing surface.

Preferably the bearing arrangement includes damping means defined by the spring means and responsive to displacement of any particular bearing pad by rotation eccentricity of the shaft within the shaft space to reduce the return of energy from the spring means to the shaft substantially in phase with the eccentric rotation.

Preferably the spring means comprises a plurality of individually deflectable resilient elements stacked together.

The resilient elements may be dimensionally limited in a direction circumferentially of the housing and stacked to be associated with individual bearing pads independently of pads circumferentially spaced therefrom, or the elements may extend circumferentially and be stacked circumferentially offset from their neighbours so as to contribute to the support of a plurality of circumferentially spaced bearing pads. In both cases the stacking of individually deflectable resilient elements provide friction damping by relative movement of the abutting element surfaces during deflection of the stacks. In the latter case, the resilient elements may respond to loading by an eccentrically rotating shaft to effect not only such friction damping but also, by coupling loaded pad displacement to circumferentially spaced pads, phase-displaced damping loading on the shaft.

According to a second aspect of the present invention a back-up journal bearing for a separately borne shaft comprises a journal bearing arrangement as defined in the preceding paragraphs having a plurality of arcuate bearing pads each biased by the associated spring means against the stop means and defining by the locus of the bearing surface thereof, a shaft space having a cross-sectional dimensions in excess of shaft to be contained therein to define during shaft rotation an operating gap corresponding to a permitted degree of shaft position departure from concentricity with the shaft space.

DESCRIPTION OF DRAWINGS

Embodiments of the invention will now be described by way of example with reference to the accompanying drawings, in which.

DETAILED DESCRIPTION OF EXEMPLARY EMBODIMENTS

Figures 1, 1A, 1B:
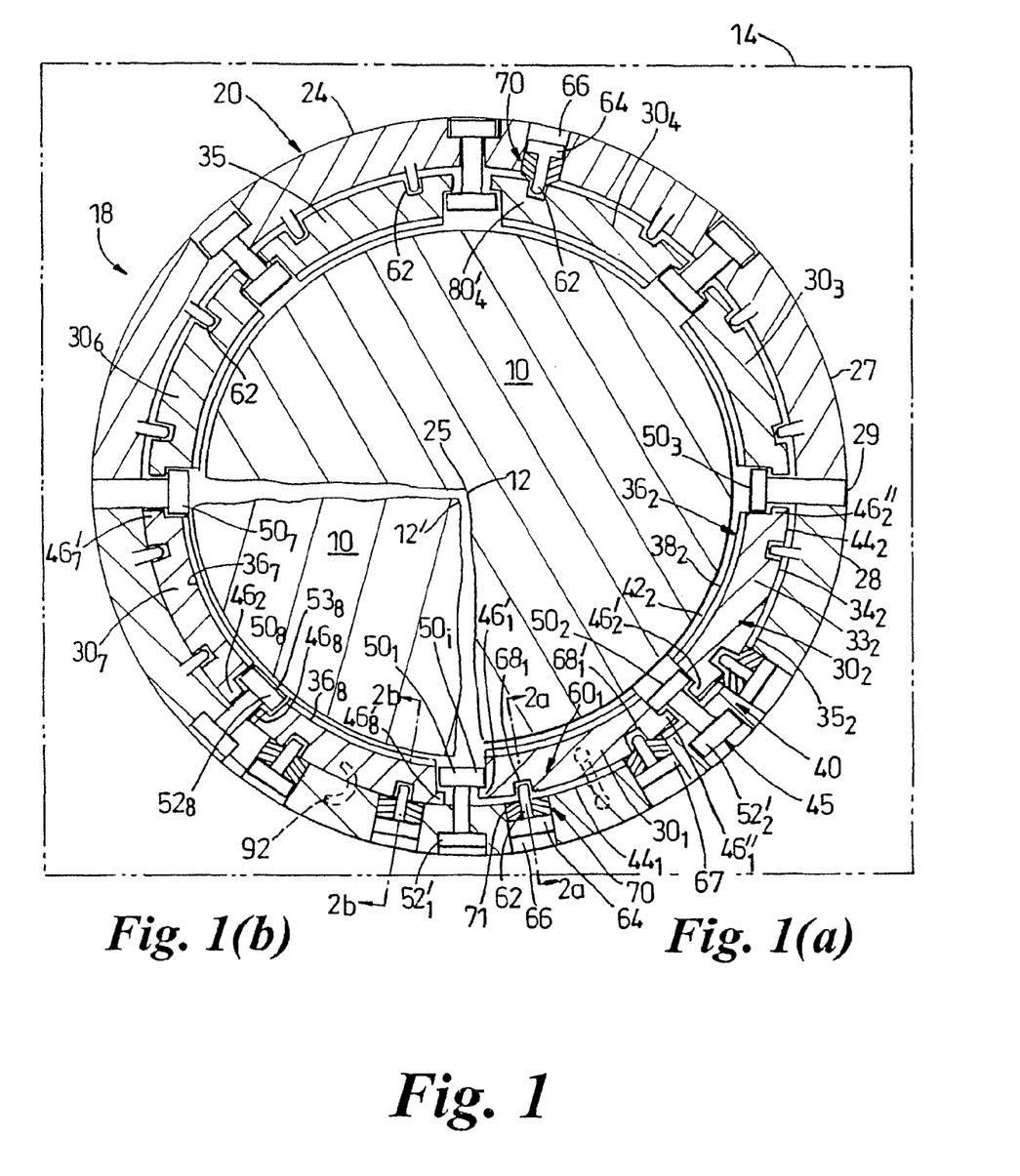
FIG. 1 is a composite of cross-sectional elevation views of FIGS. 1(a) and 1(b) through a first embodiment of housed back-up journal bearing arrangement in accordance with the invention for a shaft suspended magnetically in the housing, illustrating the structure of the bearing from an array of arcuate bearing pads surrounding a shaft and mounted with respect to the housing by individually associated stacks of individually resilient spring elements, and the component views each showing different operating conditions.
Figures 2A, 2B:
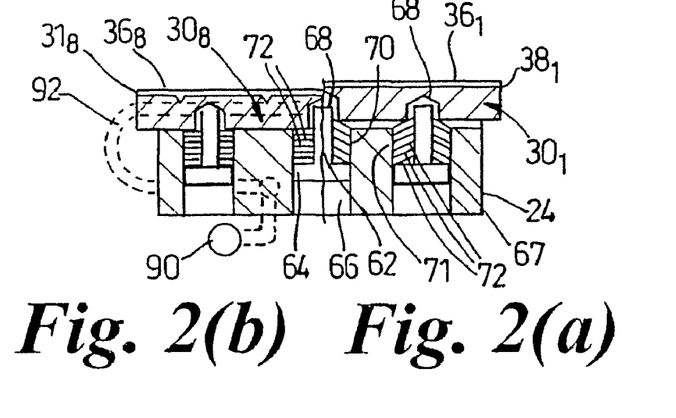
FIG. 2(a) is a sectional elevation taken in the direction 2a-2a of FIG. 1(a), showing the shaft in normal operative disposition with respect to the back-up bearing pads.
FIG. 2(b) is a sectional elevation along the direction 2b-2b of FIG. 1(b), showing the shaft in load imposing disposition with respect to the back-up bearing pads.

Referring to FIGS. 1 to 2(b), a shaft 10 has a cylindrical surface 11 defined by a longitudinal axis 12 about which it is rotatable. The shaft is contained within a housing, indicated generally at 14, wherein in operation it is arranged to rotate supported by a suspension arrangement, indicated generally at 18, including an electromagnetic suspension bearing 5, shown in FIG. 8(a), conventional in the art. In accordance with the present invention a journal bearing arrangement 20 is mounted with respect to the housing 14 which forms a back-up bearing arrangement as described further hereinafter. The journal bearing includes a part of the housing shown at 24 arranged to surround the shaft in operation and has a longitudinal axis 25 nominally coincident with the shaft rotation axis 12.

Although the bearing arrangement exists independently of a shaft with which it is intended to work, and in keeping with its independent existence it is convenient to refer to the bearing arrangement as surrounding a shaft space 26, the dimensions and other parameters of such shaft, such as its rotational inertia and static weight influence the arrangement and for clarity of illustration and description, the upper and right hand parts of FIG. 1, designated as FIG. 1(a), are shown with the shaft in place and normal operative disposition. The lower left hand side of FIG. 1, designated as FIG. 1(b), shows the shaft in place but displaced radially from its normal operative disposition, as described in more detail below.

The housing part 24 may be a unitary body or comprise upper and lower semi-circular components or shells 27 and 28 joined along a diametric interface 29, as illustrated. The housing part 24 is lined internally by a ring of N arcuate bearing pads $30_1$-$30_N$ spaced from each other in a circumferential direction about axis 25. In this specification, reference to circumferential direction and bearing pads being spaced circumferentially are to be construed accordingly. N may be an even or odd number, and as illustrated there are eight pads $30_1$-$30_8$ disposed in diametrically opposite pairs with a whole number of pads being contained within each housing component.

Each arcuate pad $30_i$ (where i=1 to 8) comprises a steel body $33_i$ having a substantially cylindrical convex radially outer face $34_i$ which overlies a correspondingly shaped housing surface region $35_i$, and a cylindrically concave radially inner face $36_i$ defined by a layer of sliding bearing material $38_i$. whereas the same features are replicated for each bearing pad $30_i$, the Figure shows the features mainly in respect of pads $30_1$, $30_2$, and $30_8$.

In this embodiment the sliding bearing material is a dry-running, lubricant filled sintered metal material, such as that available from Federal-Mogul Deva Werke GmbH, Stadtallendorf, Germany under the trade mark DEVA.

Each pad $30_i$ is mounted with respect to the housing 24 by mounting means, indicated generally at 40, whereby the array of bearing pads define by the locus of their bearing surfaces $36_i$ the shaft space 26 such that with the shaft 10 in normal operational disposition, that is, with the axes 12 and 25 coincident, the shaft is spaced radially from the bearing surfaces by a small gap, such as that shown at $42_i$, and furthermore the convex surfaces $34_i$ are displaced radially from the housing by a gap $44_i$.

The radius of curvature of the face $36_i$ may be larger than that of the shaft surface 11 such that they are concentric when separated by gap $42_i$, may be substantially equal to that of the shaft such that it conforms to the surface when in contact therewith, or may be a compromise and between the two values.

The mounting means 40 also comprises stop means, indicated generally at 45, for limiting radially inward displacement of the bearing pads, that is, movement away from the housing surface. As part of the stop means, each pad $30_i$ has formed at its ends $30'_i$ and $30''_i$, or other convenient edges, pad end shoulders $46'_i$ and $46''_i$ respectively, each shoulder having a surface $47'_i$ and $47''_i$ facing towards the shaft space and rebated with respect to the bearing surface, and each shoulder has associated therewith a restraining boss extending from the housing surface adjacent the pad edge and having a head portion disposed to overlie the shoulder to limit displacement of the bearing pad away from the housing surface and permit displacement of the bearing pad towards the housing surface.

In this embodiment, each restraining boss is disposed between adjacent pads so that its head portion overlies at least one end shoulder of at least one adjacent pad. That is, each pad $30_i$ has associated therewith a pair of headed restraining bosses $50_i$ and $50_{(i+1)}$ which extend radially inwardly from the housing surface between adjacent pads i and (i+1) and boss heads $52_i$ and $52_{(i+1)}$ which overlie the shoulders $46'_i$ and $46''_{(i+1)}$ respectively, the boss heads, when abutted by the pad shoulders, being recessed with respect to the concave bearing surface $36_i$ by at least the thickness dimension of gap $44_i$.

As can be seen, each headed boss is shared between the adjacent pair of pads, and for pad $30_8$, the restraining bosses $50_8$ and $50_1$ are employed. In this embodiment, each boss is fixed in position with respect to the housing, but if required the boss $50_i$ could be radially displaceable with respect to the housing, and may be slidable in conjunction with an abutment, such as exemplary screw head $52'_i$, which limits its radially inward travel.

The mounting means 40 also comprises, associated with each pad, one or more support pegs 60 each of which has a shank 62 extending substantially radially into the gap $44_i$ from a head 64 effecting threaded engagement with a through-aperture 66 in the housing wall at 67 that permits the radial position of the head to be adjusted. Each associated bearing pad $30_i$ has in its convex face $34_i$ a corresponding number of recesses $68_i$ and $68'_i$ each dimensioned to receive with clearance a protruding peg shank 62 and permitting the pad to slide thereon in a generally radial direction, within the limits imposed by abutment with the headed bosses and housing wall.

The mounting means 40 further comprises spring means 70 comprising a plurality of individually deflectable resilient elements stacked together and sandwiched with respect to an associated bearing pad and the housing so that the stack is deflectable by deformation of each of the elements. At least one, and typically each, support peg 60 carries on its shank 62, a stack 71 of annular dished washer springs 72 of the type also known as Belleville washers or disc springs.

The head 64 of each peg is positioned within its respective aperture 66 and fixed with respect to the housing such that the spring stack 71 thereof urges the pad away from the housing surface and to the extent limited by, and permitted by reaction from, the stop means. Furthermore, the head 64 of each support peg is positioned within its aperture such that the spring means is put into compression by the reacting inter-pad bosses to a predetermined level of pre-load. That is, each bearing pad is positioned in abutment with the headed bosses and defining a gap $44_i$ with respect to the housing, and only in response to a radially directed load on the face $36_i$ of the bearing pad that is in excess of the spring loading will the pad be displaced towards the housing. However, insofar as such displacement is accompanied by further compression of the spring means 70, the resistance to pad displacement also increases progressively as a function of displacement, although ultimately the bearing pad will 'bottom' against the housing and the mounting become rigid.

Such a situation is illustrated in FIG. 1(b), in which it will be seen that the shaft axis as shown at 12' is displaced from concentricity with the housing and is bearing directly upon the corresponding shaped surface of bearing pad $30_8$ and has pushed the pad into engagement with the housing. As mentioned above, the relative depth of each end shoulder $46_7$, $46'_7$ and $46_8$, $46'_8$ is such that the boss heads $52_7$, $52_8$ and $52_1$ remain recessed with respect to the bearing surfaces $36_7$ and $36_8$ and do not contact the shaft, although it will be appreciated that the boss heads may be provided with a bearing material and form a bearing surface (shown ghosted at $53_8$) flush with the surface of a correspondingly rigid, bottomed bearing pad.

It will be appreciated that although the surfaces of the shaft, bearing pads and housing are essentially concentric when separated by the gaps 42 and 44 such contact can only be effected by displacement of the shaft and thus, in practice, the displaced shaft can make contact with only a few of the bearing pads at any one time.

In the event of the bearing arrangement 20 providing back-up for fully supporting the shaft absent magnetic suspension, the principal loading is due to the weight of the shaft and confined to the lower part of the housing. Therefore, the spring means 70 in respect of its association with mounting the bearing pads $30_1$, $30_2$, $30_7$ and $30_8$ may be pre-loaded to such a level that a load corresponding to the component of shaft weight thereon is insufficient to displace the pad from abutment with the headed bosses of the stop means.

If the weight of the shaft is the only concern, the bearing pads $30_3$-$30_6$ may be mounted differently. However, as will be appreciated from the following, it is preferred to pre-load the spring means associated with the upper part of the housing, that is, pads $30_3$-$36_6$. All bearing pads may be mounted with the same degree of pre-load but it may be beneficial to vary it for pads at different positions about the housing.

In the event of the bearing arrangement 20 being subjected to external forces, or to out-of-balance forces, that are beyond the ability of the magnetic suspension to control, whilst the shaft continues to rotate, such rotation eccentricity may cause the surface of the shaft to bear against the bearing pads $30_1$-$30_8$, at least temporarily, and exert a radial load thereon. If the load is less than the pre-load applied by the mounting means the pad will support the shaft whereas if the load is greater the pad will displace against the bias of the spring means retarding the radial displacement of the rotating shaft, either halting it completely or considerably reducing the impact with respect to the housing.

However, such resilient support by any bearing pad of the rotating shaft is achieved by the associated spring mean stacks storing energy upon deflection and returning it to the shaft as displacement load decreases, and return of energy from the spring means to the shaft substantially in phase with load variation of eccentric rotation may exacerbate the eccentricity. The mounting means 40 includes damping means, indicated generally at 80, which is defined by the spring means 70 and responsive to displacement of any particular bearing pad by the shaft to reduce the return of energy from the spring means to the shaft substantially in phase with the eccentric rotation.

Insofar as the spring means comprises at least one stack 71 of individually deflectable springs 72 associate with each bearing pad, the friction damping means comprises each said stack of springs providing friction, or Coulomb, damping by virtue of relative sliding between their abutting surfaces during deflection when being loaded and unloaded. Thus, a load applied to a bearing pad is partly dissipated as frictional heat and partly stored within the deflected springs, increasing the apparent stiffness of the spring stack, and only part of the stored energy is returned to the shaft as the load is removed, decreasing the apparent stiffness of the spring stack.

It will be appreciated that the amount of friction damping achieved by each said spring stack is dependent upon the areas, and number, of individual abutting spring surfaces.

The pre-load on the spring means not only reduces the amount of space, that is gap $44_i$, required for effective restraint of the large forces generated if the back-up bearing is to be operative, but also, with the number of disc springs and their individual thickness, permits tuning of the damped response to loading and deflection.

Therefore, it will be seen that the damped resilient response of each bearing pad may be varied by adjustment of any individual pad mounting as a function of loading forces anticipated or actually experienced for any particular shaft.

By virtue of the positional relationships between the mounting spring means and the restraining bosses $50_i$, some resilience may be experienced in the form of tilting even for loading levels between the shaft and any bearing pad that are insufficient to physically displace the pad as a whole, but in any event to mitigate surface damage to an impacting shaft.

Clearly a number of variants may be applied to the above described embodiment without departing from its operating principles, operational variants such as differences in pre-loading at different positions about the housing and structural variations such as the number of pads, the number and disposition of mounting pegs and the form taken by the spring means.

Figure 3:
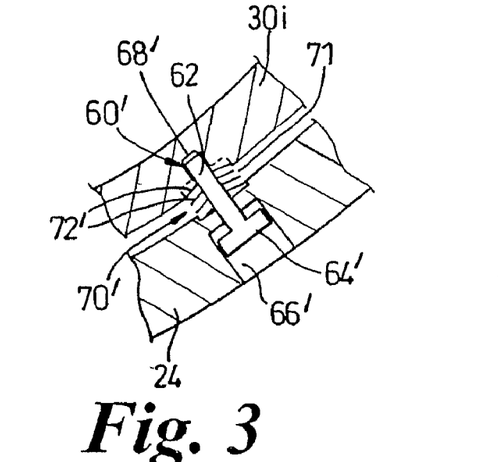
FIGS. 3 and 4 are fragmentary cross-sectional elevation views of the parts of alternative forms of mounting means.
Figure 4:
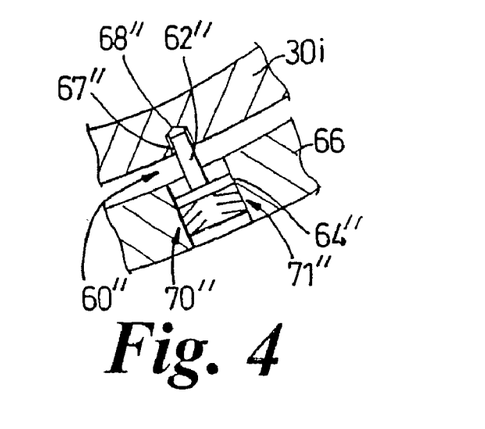

In alternative constructions shown in the fragmentary views of FIGS. 3 and 4 respectively, the mounting pegs may have their shank portions fixed with respect to the associated pads and their head portions slidable with respect to the housing.

Referring to FIG. 3, mounting peg 60' has its shank portion 62' fixed with respect to the recess 68' of an associated pad by thread engagement 67' and head portion 64' slidable with respect to housing aperture 66'. The aperture has a constriction 69' defining a shoulder adjacent the housing surface and gap 44 reducing its cross section but dimensioned to permit sliding passage of the peg shank but prevent passage of the head. Spring means 70' comprises a stack 71' of disc springs 72' contained in the gap 44 and most conveniently received within the pad and/or housing surface when fully compressed. It will be seen that the head 64' may be caused to bear on the constriction shoulder 69' to effect pre-loading of the springs and be displaced therefrom with displacement of the bearing pad.

Referring to FIG. 4, the housing contains an aperture open at its radially inner end but closed or plugged at its radially outer end to define blind recess 66". A mounting peg 60" has its shank portion 62" fixed with respect to the recess 68" of an associated pad by thread engagement 67" and head portion 64" slidable with respect to blind housing recess 66". Spring means 70" is disposed between the head 64" and the closed end of the recess 66" as a stack 71" of disc springs 72" compressed when the pad is displaced.

It will also be appreciated that the stop means 45 may be formed other than by the pad shoulders $46'_i$ and $46''_i$ and headed bosses $50_i$ and $50_{(i+1)}$ at edges comprising the circumferentially extending ends of the pads, such as at one or more axially facing sides of the pads. Alternatively, the stop means may dispense with rebated shoulders and restraining bosses and hold the pads movable with respect to the housing by way of a headed screw slidably extending through the housing into the convex surface of the pad and limited in radially inward displacement by abutment with the housing. Such limiting may be provided by the support pegs 60' and aperture constrictions 69' of FIG. 3 with the spring means, or by similar pegs (not shown), without the spring means, displaced circumferentially and/or axially thereof to aid tuning of damping means.

Although the embodiment has been described and illustrated with dry running, lubricant impregnated bearing layer material, other bearing materials may be used for the pad surfaces, and notwithstanding the sliding bearing material, the journal bearing arrangement 20 may include fluid supply means, indicated generally at 90, which is operable to supply lubricating and/or cooling fluid to the bearing surface $36_i$ of each pad from the housing by way of ducts 92 in the body of the pad.

Figure 8A:
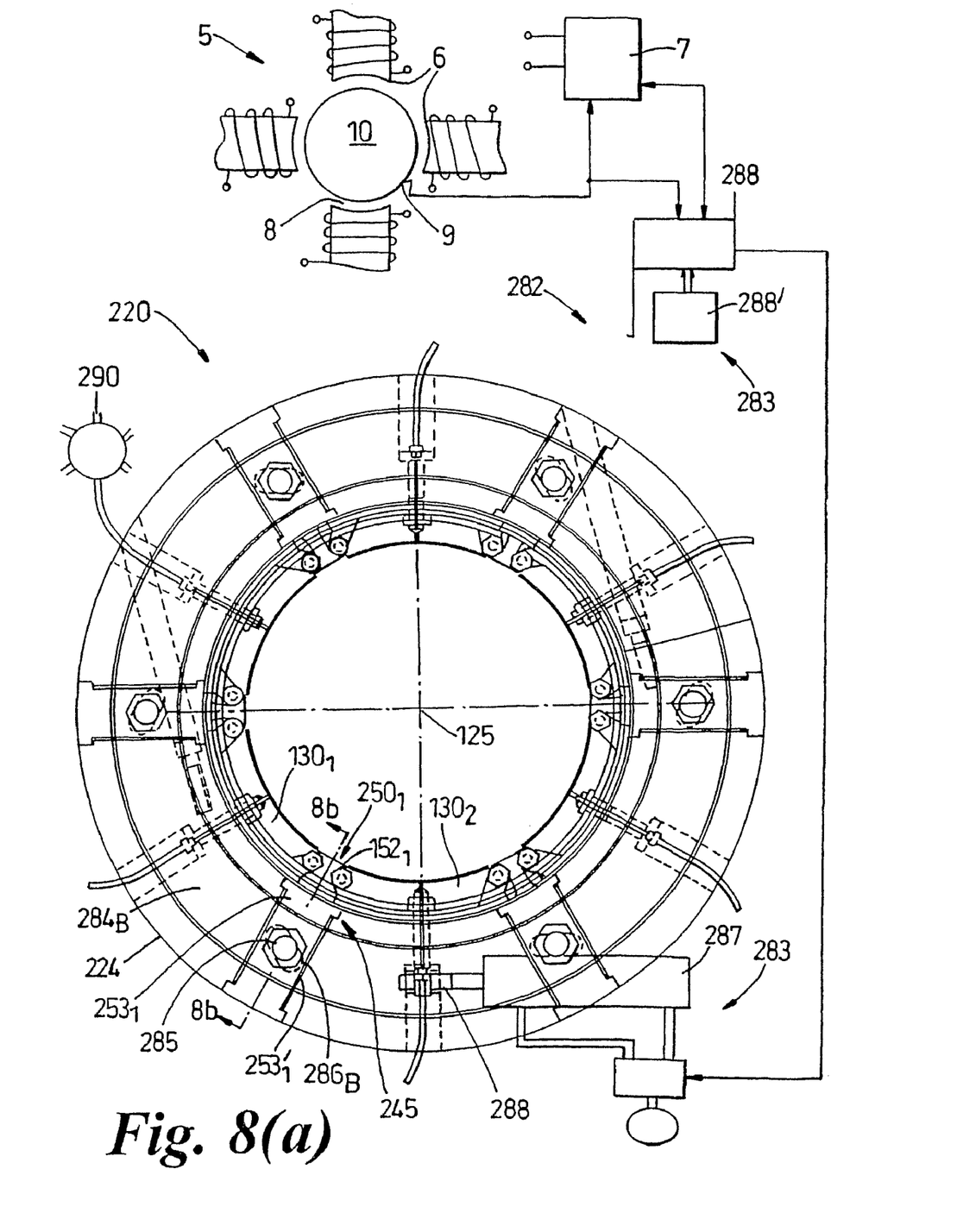
FIG. 8(a) is an end view of a third embodiment of a housed back-up bearing arrangement in accordance with the present invention, and of a magnetic bearing with which associated, similar to the second embodiment but in which the restraining bosses are displaceable to vary the radial positions of the bearing pads, and able to respond to failure of the magnetic bearing to displace the bearing pads towards bearing contact with the shaft.

Insofar as the bearing means 20 comprises a back-up bearing for a controlled magnetic suspension arrangement and comes into operation when the magnetic suspension, which includes sensors, is unable to support the shaft, such inability may be sensed and employed by back-up control means 7 (FIG. 8($a$)) in the manner described in GB-A-2268983 and the fluid supply means 90 connect and maintain a supply of pressurised fluid, conveniently gaseous, to and through at least those bearing pads upon which the shaft is going to bear or is actually bearing, as indicated by the ghosted ducts 92, to form a hydrostatic (or aerostatic) bearing between the concave pad surface and shaft. Although the effect of any such fluid pressure acts against the bearing pads and their resilient mountings, the pre-load applied can be made to ensure that the pad is not displaced except in adverse conditions.

It will be appreciated that the thickness of gap $42_i$ between any pad $30_i$ and shaft is small in normal operation but significantly greater than when such pad is supporting a load. However, fluid may be supplied during normal operation at a low rate to all or selected bearing pads to provide a coolant effect and/or to provide a fast reacting support, particularly if the magnetic bearing senses a reduction in confidence in the level of support offered thereby. The low pressure such flow does create as a result of resistance to leakage and/or its compressibility (if a gas) may provide an additional tuning parameter for damping the resiliently mounted bearing pads.

Having regard to the above description relating to a back-up bearing for a magnetic suspension, it will be appreciated that such a bearing arrangement may instead, and without such magnetic suspension, form a primary shaft support bearing of hydrostatic or hydrodynamic form if the gap $42_i$ is small and permanently provided with a supply of fluid by way of the bearing pads $30_i$, at least when the shaft is rotating, in a load supporting film. Unbalance or external forces acting to displace the rotating shaft will for most aspects of operation be accommodated by a local increase of pressure within the reducing gap between shaft and bearing face, but in the event of the forces becoming larger than the pre-load on a particular pad, the bearing pad is able to displace and contribute toward the restoring force applied to the shaft without collapse of the fluid film between them.

In the above description, the curvature of the bearing pads will be determined according to the nature of operation and additional lubricant, if any, associated with the bearing form. It will be appreciated from FIG. 1($b$) that by providing concave face $36_i$ with a radius of curvature equal to that of the shaft it offers maximum conformity if the shaft is displaced directly towards it, but less so if the shaft load is shared by adjacent pads. Also, the gap $42_i$ of normal operation is non uniform about the axis. At the other extreme, if the centre of curvature of each bearing pad is coincident with that of the housing and normal position of the shaft then there is a uniform gap 42 but a displaced shaft will not bear fully on any particular bearing pad. Accordingly it may be most practicable to specify a curvature between these extremes. However, the gap 42 will in practice be small, say of the order of 0.5 mm, so that the above-mentioned compromise curvature is sufficient for effective support. Such considerations are of lesser concern with a fluid lubricated hydrostatic or hydrodynamic bearing wherein the relationship between the shaft and bearing surfaces across gap 42 in normal operation is of primary concern.

Although dished washer springs are convenient to employ, not least because their annular form makes their behaviour uniform in respect of forces applied inclined to the radial direction, springs of other shapes may be employed that are suited to stacking in a nested form. For example, the springs may have a cylindrical curvature about an axis perpendicular to the radial direction and be substantially flat in the direction of the curvature axis. Also, insofar as the springs have an inclination with respect to the pad and/or housing surface, they may have an overall extent circumferentially greater than the pads.

In the above described first embodiment and its variants, the components of the spring means associated with each bearing pad are self-contained whereby each bearing pad can not only move independently of the others but also its movement characteristic, that is, pre-load, spring stiffness and frictional damping can be tailored independently and in accordance with its position about the housing axis with few component changes. However, although the resilient mounting of the bearing pads serves to absorb and dissipate forces displacing the shaft from concentricity with the housing, such an essentially passive response may not be the best for all operating circumstances.

For example, in the magnetic bearing 5 discussed above, wherein a shaft is intended to rotate about its longitudinal axis concentric with the housing and spaced by a gap from the bearing pads which define a back-up bearing, if the shaft begins to rotate eccentrically about an axis displaced from the housing axis, that is, to whirl, it tends to close the gap adjacent one bearing pad as it rotates from pad to pad and periodically impact with each of the pads may, notwithstanding their damped resilient mounting, fail to prevent growth of the eccentricity of rotation, at least within a timescale that can prevent impact wear or damage to the surfaces involved or to the shaft as a whole.

Referring now to FIGS. 5(*a*) to 5(*e*), FIG. 5(*a*) shows an end view of a second embodiment of journal bearing arrangement 120 which forms a back-up bearing to a separately, magnetically, suspended shaft 10 described above. Some of the components above have substantial correspondence with those described above and in general, have numbers increased numerically by "100".

Figure 5A:
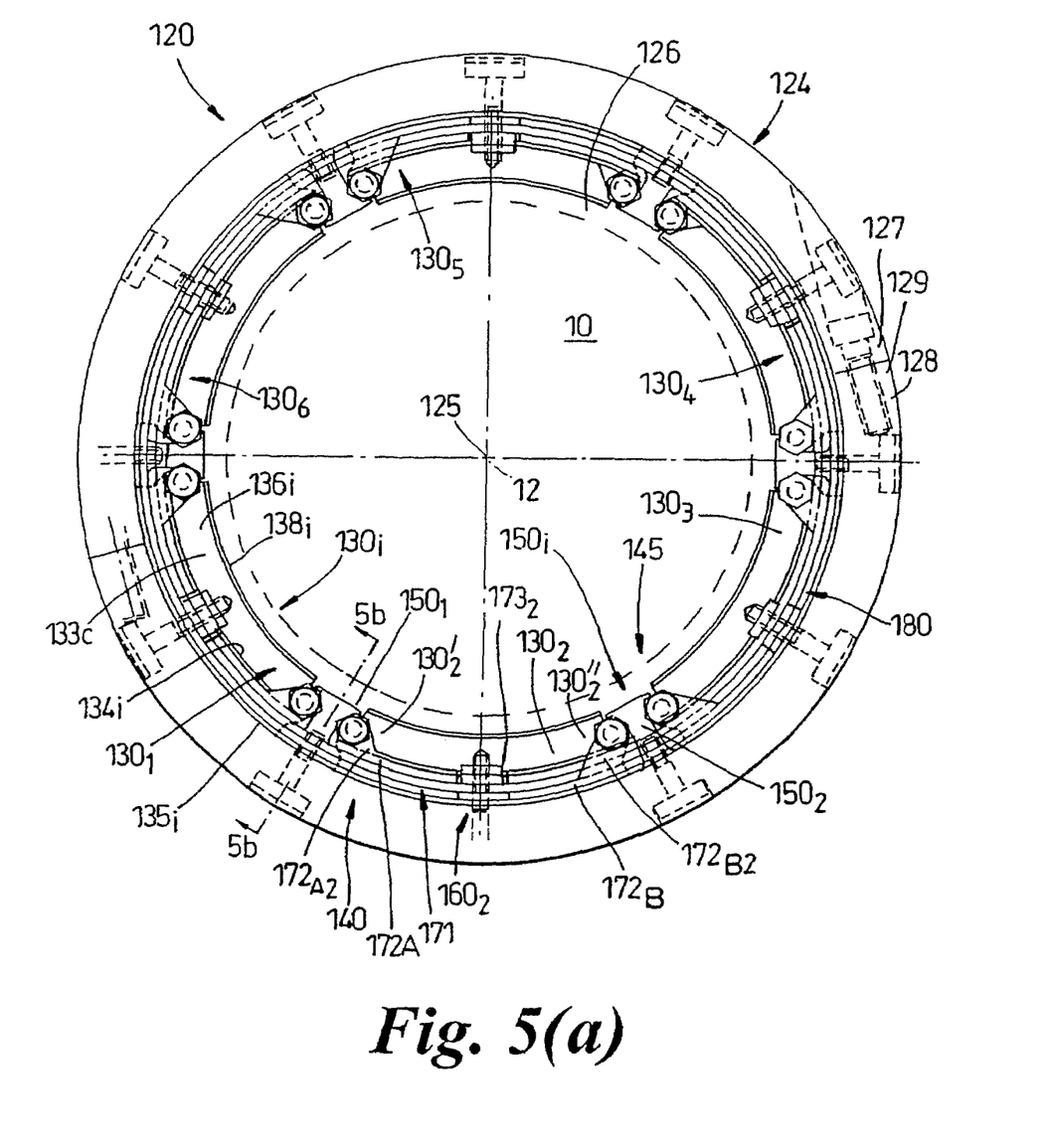
FIG. 5 is an end view of a second embodiment of a housed back-up bearing arrangement in accordance with the present invention for a shaft magnetically suspended in the housing, comprising n array of six arcuate bearing pads surrounding the shaft and mounted with respect to the housing by inter-pad restraining bosses and stacks of individually resilient spring elements whose spring elements extend, and are relatively offset, circumferentially so as to contribute to the support of a plurality of circumferentially spaced bearing pads.
Figure 5B:
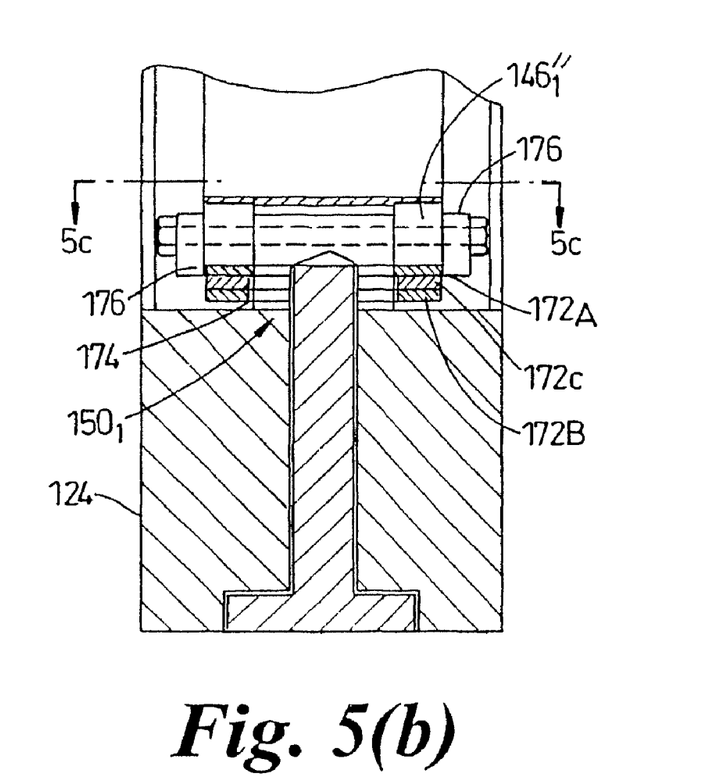
FIG. 5(b) is a sectional elevation along the lines 5b-5b of FIG. 5(a)

The back-up bearing arrangement 120 comprises a housing 124 of cylindrical form having a longitudinal axis 125 and enclosing a shaft space 126 which, in operation, is intended to contain separately suspended shaft 10 for rotation about a shaft axis 12 coincident with the housing axis 125.

The housing part 124 may be a unitary body or, as illustrated, comprise upper and lower semi-circular components or shells 127 and 128 joined along a diametric interface 129, being lined internally by a ring of six arcuate bearing pads 130$_1$-130$_6$ spaced from each other in a circumferential direction about axis 125.

Each arcuate pad 130$_i$ (where i=1 to 6) comprises a steel body 133$_i$ having a substantially cylindrical convex radially outer face 134$_i$ which overlies a correspondingly shaped housing surface region 135$_i$, and a cylindrically concave radially inner face 136$_i$ defined by a layer of sliding bearing material 138$_i$. The sliding bearing material may be a dry-running, lubricant filled sintered metal material as described above, or one requiring a fluid lubricant applied thereto as discussed below.

Each pad 130$_i$ is mounted with respect to the housing 124 by mounting means, indicated generally at 140, whereby the array of bearing pads define by the locus of their bearing surfaces the shaft space 126 such that with the shaft 10 in a desired operational disposition, that is, with the axes 12 and 125 coincident, the shaft surface is spaced radially from the bearing pad surface 136$_i$ by a small gap, and furthermore the convex surface 134$_i$ is separated radially from the housing surface.

Figure 5C:
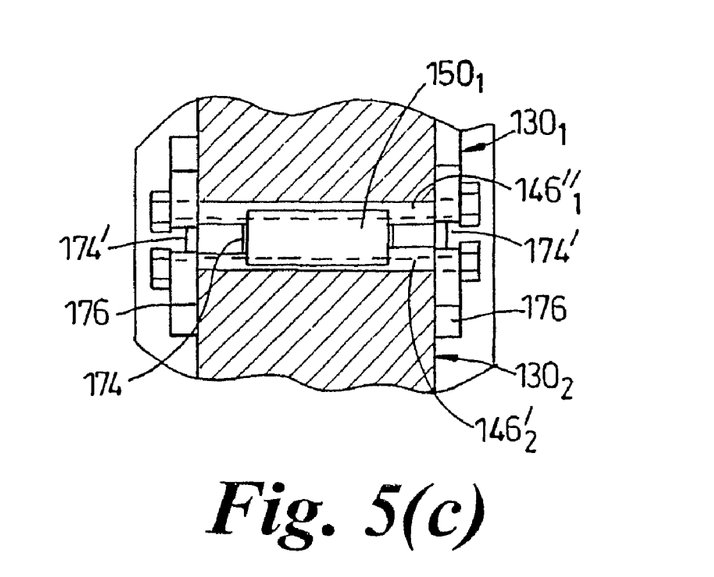
FIG. 5(c) is a plan view along the lines 5c-5c of FIG. 5(b)
Figures 5D, 8B, 9:
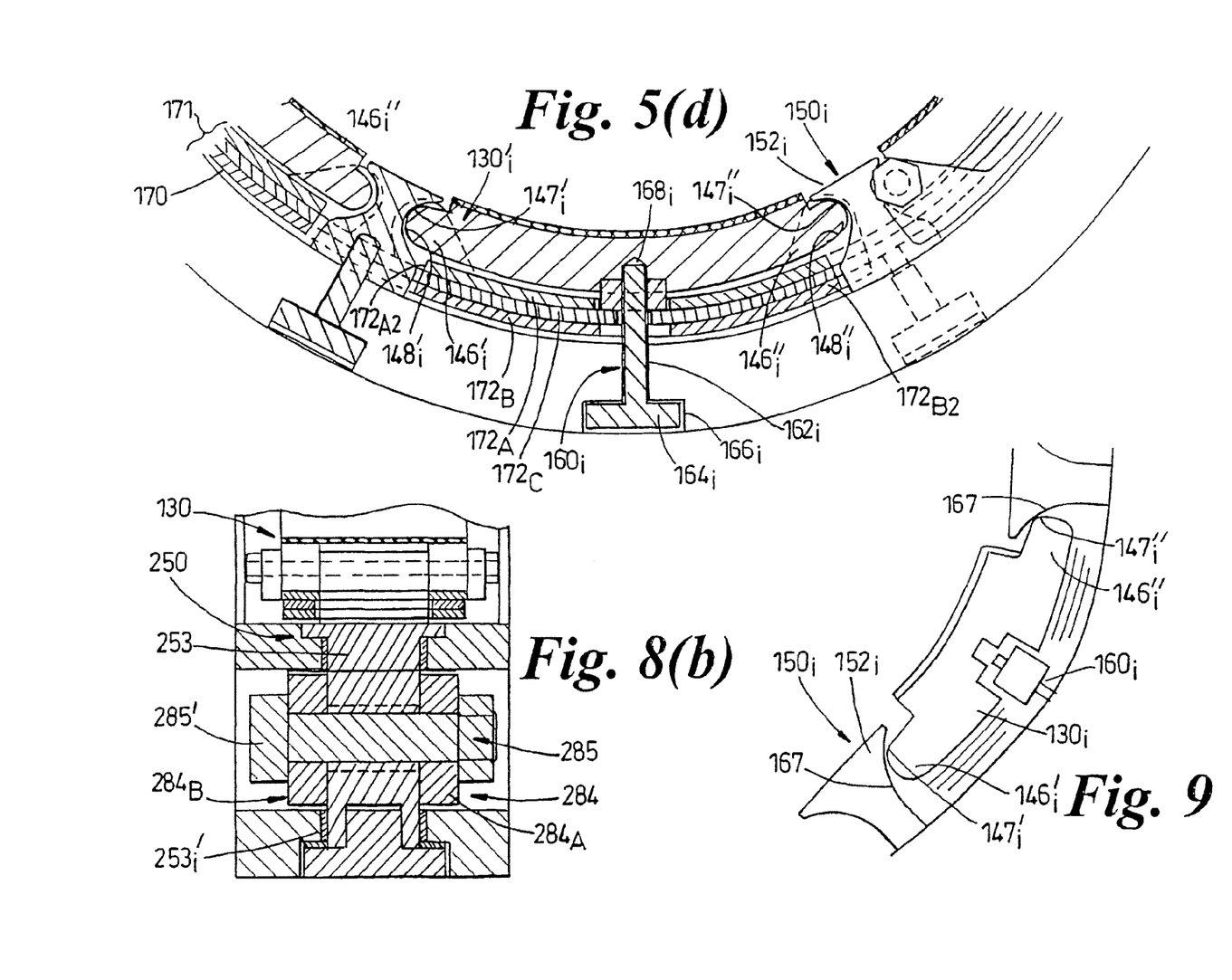
FIG. 5(d) is an enlarged view, partly in sectional elevation, of the arrangement of FIG. 5(a), showing the relationship between bearing pad end shoulders and restraining bosses of inter-pad stop means.
FIG. 8(b) is a cross-sectional elevation through the bearing arrangement of FIG. 8(a) along the line 8b-8b.
FIG. 9 is a schematic view of a modification of the part of the bearing arrangement of FIG. 5(a) illustrating an alternative construction of bearing pad shoulders and restraining bosses and operation in response to a radially and circumferentially applied loads.
Figure 5E:
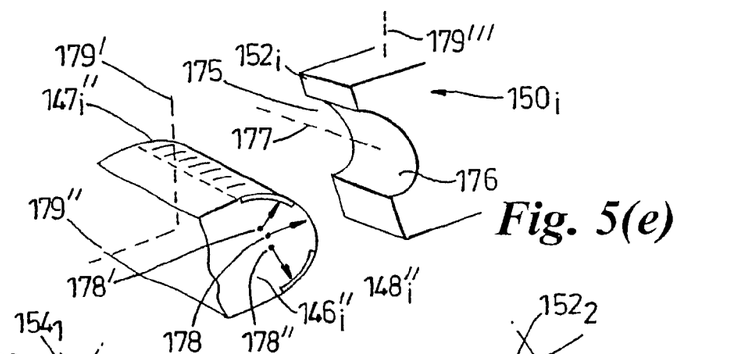
FIG. 5(e) is a schematic perspective view of the relationship between bearing pad end shoulders and restraining bosses.

The mounting means 140 comprises pad stop means, indicated generally at 145, for limiting radially inward displacement of the bearing pads, that is, movement away from the housing surface. As best seen in FIG. 5(*d*), which shows the lower portion of FIG. 5(*a*) enlarged and partly in sectional elevation, and in FIG. 5(*e*), each pad 130$_i$ has formed at its end regions 130'$_i$ and 130"$_i$ pad end shoulders 146'$_i$ and 146"$_i$ respectively, each shoulder having a surface 147'$_i$ and 147"$_i$ facing towards the shaft space and rebated with respect to the bearing surface and a further shoulder 148'$_i$ and 148"$_i$ facing away from the shaft space. Each shoulder, such as 146"$_i$, has associated therewith a pad stop, or restraining boss, 150$_i$ extending from the housing surface adjacent the pad end region and having a head portion 152$_i$ disposed to overlie the shoulder to limit displacement of the bearing pad away from the housing surface by abutment with the shoulder surface 147"$_i$ but permit displacement of the bearing pad towards the housing surface, until limited by abutment with the shoulder further surface 148"$_i$.

Each restraining boss is disposed between adjacent pads so that its head portion overlies at least one end shoulder of at least one adjacent pad; most practicably, and as shown, the boss is shared by adjacent pads. That is, the restraining boss 150$_1$ is disposed between the bearing pads 130$_1$ and 130$_2$, restraining boss 150$_2$ is disposed between the bearing pads 130$_2$ and 130$_3$ and so on. Looked at another way, the bearing pad 130$_2$ has associated therewith a pair of restraining bosses 150$_1$ and 150$_2$ whose heads 152$_1$ and 152$_2$ overlie the shoulders 146'$_2$ and 146"$_2$ respectively.

The mounting means 140 also comprises, associated with each pad 130$_i$, a support peg 160$_i$ which has a shank 162$_i$ extending substantially radially from a head 164$_i$ that effects threaded engagement with a through aperture 166$_i$ in the housing wall. Each said associated bearing pad has in its convex face 134$_i$ a corresponding recess 168$_i$ dimensioned to receive a protruding peg shank with a clearance permitting the pad to pivot and slide thereon.

The mounting means 140 also includes spring means 170 comprising a plurality of individually deflectable resilient elements in the form of leaf springs 172$_i$ (where i=A, B, C . . .) extending circumferentially with respect to the housing and shaft space between the bearing pads and the housing surface. Each of the leaf springs has a substantially cylindrical curvature centred on the housing axis 125 and a natural radius of curvature substantially equal to that of the others whereby the springs are able to nest one within another and bear one on another in a radial direction to form a stack 171 effecting suspension of the associated bearing pads. The leaf springs are substantially flat in a direction axially of the housing and have a width substantially equal to that of the bearing pads so that there is a considerable area of face-to-face contact between them for load transmission.

Continuing to take bearing pad 130$_2$ as an example, the stack comprises associated with each bearing pad, a first spring 172$_A$ terminating adjacent one end region 130'$_2$ of the pad and pivotally secured thereto at shoulder 146'$_2$, a second spring 172$_B$ terminating adjacent the opposite end region of the pad and pivotally secured thereto at shoulder 146"$_2$, and a third spring 172$_C$ mounted at its centre on a spigot provided by the support peg 162$_2$ and particularly the shank 162$_2$ thereof. The third spring has a small clearance with respect to its mounting spigot, being constrained thereby to sliding motion along the spigot and constrained in respect of displacement from the housing surface by a spring stop $173_2$ in the form of a nut positionable along the axis of the spigot to define the limit of displacement. The first and second springs have a greater clearance of the spigot so that it presents no impedance to their displacement relative to the housing and to each other.

Each of the leaf springs $172_A$ and $172_B$ has, at its termination $172_{A2}$ and $172_{B2}$ adjacent a respective end region $130'_2$, $130''_2$ of a bearing pad a width in an axial direction slightly greater than the end region and axially spaced, radially extending flanges 176 arranged to flank, and be secured to, the pad shoulders.

Functionally, the third spring may be considered as a primary spring whilst the first and second springs, secured to the pad, may be considered as secondary springs, and herein referred to as such.

In this embodiment, there are the same number of leaf springs as there are bearing pads, that is, six, and the leaf springs are of substantially equal length. As will be apparent from FIG. 5(a), the leaf springs are arranged each to extend circumferentially and effect support for three adjacent circumferentially spaced bearing pads, each of said springs $172_A$, $172_B$ and $172_C$ being offset circumferentially with respect to adjacent springs of the stack such that for each said bearing pad, say $130_2$, the associated first spring $172_A$ secured to said one end region $130'_2$ comprises a third spring $172_C$ of the pad $130_3$ spaced circumferentially in a direction towards said opposite end region $130''_2$ of the bearing pad and the associated second spring $172_B$ secured to said opposite end $130''_2$ comprises a third spring $172_c$ of the pad $130_1$ spaced circumferentially in a direction towards said one end $130'_2$ of the bearing pad. That is, in general for each bearing pad $130_i$, the first and second springs associated with that pad comprise respectively the third springs of the adjacent circumferentially spaced bearing pads.

Furthermore, for each said bearing pad such as $130_2$, the associated third spring $172_C$ extends circumferentially from its mounting spigot through an angle of approximately ±90°, that is, an included angle of 180°, the precise angle being dictated by the number and circumferential dimensions of bearing pads in the array and the number of bearing pads beneath which each spring extends, but preferably is within the range±(60 to 120)° for reasons discussed below.

The restraining bosses are disposed so as to maintain each spigot-mounted third, primary, spring in tension with its ends splayed apart by abutment of the bearing pad shoulders to which the ends are secured with the heads of the restraining bosses, that is, the primary spring biases the shoulders against the restraining boss heads and insofar as all the springs are mounted and secured similarly, a substantially uniform, radially directed bias is exerted between each of the bearing pads and the adjacent restraining boss heads.

As the leaf springs extend circumferentially across the gaps between adjacent bearing pads where the restraining bosses of the stop means are disposed, the restraining bosses $150_i$ each pass through an aperture 174 in each spring. To ensure spring deflection is maintained within elastic limits each said leaf spring has, in the vicinity of a said aperture, strengthening means 174' comprising one or more flanges having components extending circumferentially and radially with respect to the shaft space (as best seen in FIG. 5(c)).

Referring also to FIG. 5(e), each restraining boss $150_i$ has its head portion define a cam surface and the associated pad end shoulder a co-operable cam follower permitting the shoulder to move radially and circumferentially with respect to the shaft space in abutment with the restraining boss and for the bearing pad to move according to similar or differential movements of the shoulders at opposite ends of the bearing pad.

Each said boss $150_i$ has its head portion $152_i$ defined by a recess 175 open towards the adjacent pad and dimensioned to receive therein said pad end shoulder $146''_i$, said recess having a wall 176 generated about an axis 177 extending orthogonally to the circumferential and radial directions and defining a cam surface. The surface $147''_i$ and further surface $148''_i$ of the bearing pad end shoulder are also each generated about an axis, 178' and 178'' respectively, extending orthogonally to the circumferential radial direction as a convex cam follower arranged to permit, in abutment with the cam surface 176, translation and rotation relative thereto. The surface $147''_i$ and further surface $148''_i$ are, conveniently but not necessarily, contiguous and axes 178' and 178'' coincident defining about a common axis 178, a substantially semi-cylindrical end region for the pad.

Defining such cam and cam follower curvature about parallel axes results in a line contact which has a high loading tolerance but also a higher friction level than may be acceptable, and, if desired, at least one of the cam follower and cam surfaces may be generated also about an axis such as 179', 179'' or 179''' extending in at least one of the circumferential and radial directions to result in more of a point contact.

Figure 6:
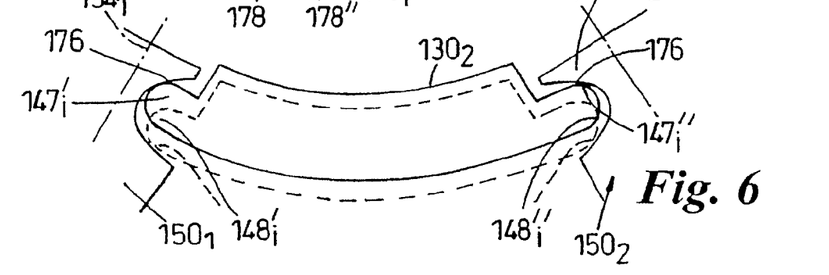
FIG. 6 is a schematic view of a part of the bearing arrangement of FIG. 5(a) to illustrate its operation in response to a radially applied load, FIGS. (7a) to 7(c) are schematic views of part of the bearing arrangement of FIG. 5(a) to illustrate quadrature damping.

Referring to FIG. 6, which is a schematically simplified view of normal operation, the springs bias the shoulder surfaces $147'_i$ and $147''_i$ against the cam surface 176.

If the separate (magnetic) shaft suspension fails to maintain a gap between the rotating shaft and any bearing pad surface because the rotation axis is displaced from the housing axis in one particular direction the shaft may bear against a bearing pad, such as the exemplary pad $130_2$. Depending upon the loading applied by the shaft, the various spring bias forces keeping the pad against the restraining boss heads $152_1$ and $152_2$ are overcome and the pad shoulder surfaces $147'_i$ and $147''_i$ are displaced radially with respect to the bosses, the displacement being resisted by the spring stack at least until the load reaches such a level that the pad end shoulder surfaces $148'_i$ and $148''_i$ abut the cam surface 176 (as shown ghosted). Such displacement causes the associated primary and secondary springs $172_A$, $172_B$ and $172_C$ both to deflect relative to the housing and re-align their positions relative to each other by sliding. The load of the shaft is thus borne with resilience which prevents damage caused by impact between the shaft surface and bearing pad.

It will be appreciated that deflection of the spring means by the deflected shaft includes storage of energy which is returned by the springs when the load is lessened. As the shaft is normally rotating when contact with the back-up bearing pads is effected, the return of energy from the spring means may cause problems if it is not damped.

The mounting means 140 includes damping means, indicated generally at 180 and defined at least in part by the spring means 170, which is responsive to displacement of any particular bearing pad by rotation eccentricity of the shaft within the shaft space to reduce the return of energy from the spring means to the shaft substantially in phase with the eccentric rotation.

Thus if the bearing pad $130_2$ is subjected to periodically applied loading by an oscillating or eccentrically rotating shaft, the spring means 170 provides damping to impede the return of energy from the springs to the shaft in phase with the loading, the abutting faces of the stacked springs effecting friction or Coulomb damping by the above mentioned relative sliding of the spring surfaces during deflection. Also, of course, insofar as each primary spring is associated with secondary springs of several pads, it will be appreciated that the frictional damping occasioned by relative movement between springs is distributed circumferentially and not confined to the springs immediately between that pad and the housing.

However, the mounting means 140 provides more than just friction, or Coulomb, damping, and the damping means 180 comprises coupling within the spring means between the stack of springs associated with the exemplary bearing pad 130₂ and bearing pads 130₁ and 130₃ spaced therefrom circumferentially about the shaft space, such that displacement of the bearing pad 130₂ in a direction towards the housing surface results in displacement of at least part of the circumferentially spaced bearing pads 130₁ and 130₃ away from the housing surface towards the shaft space and the rotating shaft therein.

Figure 7A:
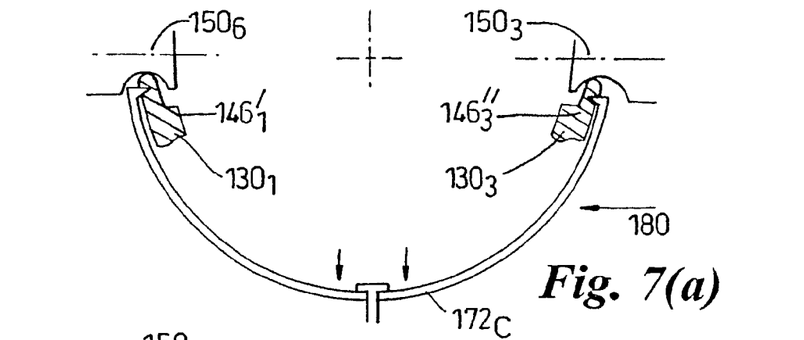
Figure 7B:
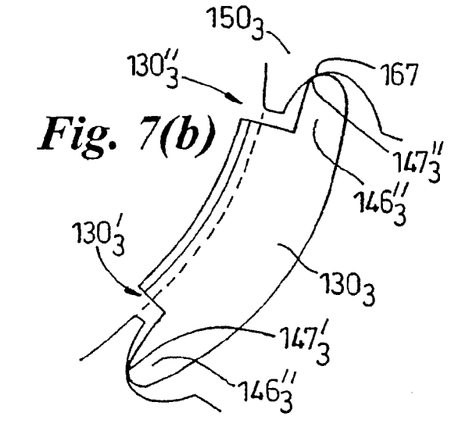
Figure 7C:
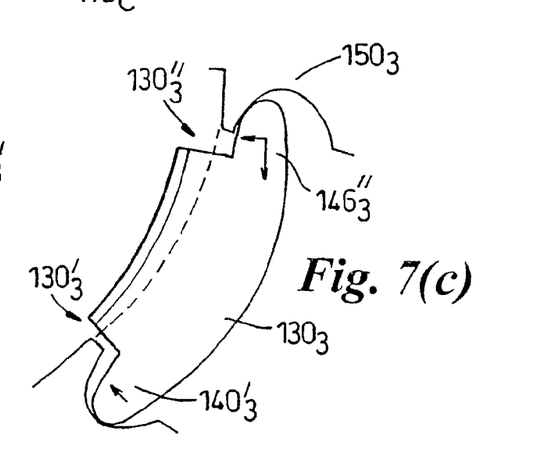

Referring to FIGS. 7(*a*) to 7(*c*), which schematically illustrate this spring coupling for the pad 130₂ with its primary spring 172$_C$, as indicated above, the circumferential length of the spring and circumferential disposition of the pads is such that in normal conditions the ends of the spring are secured to the distal end shoulders 146'₁ and 146"₃ of adjacent pads 130₁ and 130₃ and held in tension by abutment of the shoulders with the cam surfaces of the restraining bosses 150₆ and 150₃. The primary spring extends for about 90° from its mounting spigot so that in the event of radial displacement of the pad 130₂, the central region of the primary spring is also displaced and creates, at each end secured to an end shoulder of a circumferentially spaced bearing pad, a component of bias force acting substantially in the direction of said mounting spigot and operable to slide the cam follower surfaces of the circumferentially spaced pad end shoulders along the cam surfaces of the restraining bosses such that the proximal ends of the circumferentially spaced bearing pads are displaced by the cam surfaces away from the shaft space and the distal end of the circumferentially spaced bearing pads are displaced by the cam surfaces towards the shaft space such that a part of the bearing surface of that pad is tilted and displaced towards the shaft. Such circumferentially spaced displacement is arranged to bridge the gap to the eccentrically rotating shaft, resulting in the pad bearing against the shaft surface circumferentially spaced from where the shaft is applying load to the pad 130₂, that is, applying a force to the shaft shifted in phase by about 90° from the load being applied to the pad 130₂ and better able to dampen any growth in the rotation eccentricity.

Although optimum damping is achieved by such bearing loading in quadrature and advanced in phase, that is, by a circumferentially spaced bearing pad which, in respect of shaft rotation, is spaced in the direction of shaft rotation, it is convenient for the coupling within the spring means to be also between a said bearing pad 130₂ and also a circumferentially spaced bearing pad which, in respect of shaft rotation, is spaced opposite to the direction of shaft rotation. Not only does this simplify construction by virtue of the symmetry, but also makes the optimum damping independent of shaft rotation direction.

It will also be appreciated that although quadrature phase-lead damping in desirable, effective damping may be achieved with other phase angles and having the third/primary spring extend from its spigot mount by angles in the range 60° to 120° as discussed above, may achieve suitable damping. For example, a bearing arrangement similar to 120 may have eight bearing pads arrayed about the housing, each extending for approximately 45°; the primary spring associated with each may then extend through ±67.5° or ±112.5° in dependence on whether it extends beneath three or five adjacent pads. There may also be an odd number of bearing pads, say five, whereupon each primary spring may extend through ±108° to be associated with three adjacent pads. Thus each such primary spring centred in line with any particular bearing pad may extend to be secured to the ends of non-adjacent pads and/or each said mounting spigot may be other than in line with a particular pad but disposed between pads in the manner of the restraining bosses. Such variation of primary spring length thus gives considerable latitude in the number and extent of bearing pads employed.

Whilst discussing variations in the form taken by the disposition of springs and spring stack, it will be appreciated that the resilience and friction damping may be varied for the whole bearing arrangement by suitable choice of materials and dimensions of the circumferentially extending springs which are each associated with a plurality of bearing pads, may be varied about the housing axis by employing springs with different behaviour, to offer maximum load bearing to the lowest pad in the housing for supporting the weight of the shaft, or may be varied for individual bearing pads by employing additional springs, stacked with the primary and secondary springs but not extending circumferentially beyond the associated pad.

It will be appreciated that as friction damping is achieved by relative sliding between springs of the stack, the level of friction, which is a function of the overall contacting spring surface areas, may be controlled by choice of the number of surfaces and area of each. Insofar as the back-up bearing is "dry-running", if the contacts between surfaces are such that there is a risk of the springs in the stack exhibiting friction, generating excessive heat or even welding together, some or all of the spring surfaces may be provided with a lubricant or low-friction coating.

The back-up bearing arrangements 20 and 120 each require a gap between shaft and bearing pad surface for normal operation in which the shaft is able to make movements within the control band of the magnetic, or other separate bearing suspension and not contact the back-up bearing pads. Insofar as the separate magnetic suspension is maintaining control, the design must compromise between the size of the gap is required for the back-up not to come into action too soon, but without letting an eccentrically rotating shaft acquire too much out-of-balance energy to be controlled by the back-up bearing when it does operate.

However, by providing means to vary the gap in operation and separate monitoring of the shaft rotation and/or the suspension efficacy of the separate (magnetic) suspension, in the event of operational failure of the separate suspension, or even a reduction in the level of confidence of the suspension it is providing, the gap between the pads and shaft may usefully be reduced in proportion to the lack of confidence, to the extent of being eliminated in response to a detected inability of the shaft to be borne separately, that is, actual or incipient magnetic bearing failure.

Referring to FIGS. 8(*a*) and 8(*b*), FIG. 8(*a*) shows a shaft 10 magnetically suspended by an actively controlled electromagnetic bearing 5 of a generally known form comprising an array of electromagnet armature poles through which current is passed by magnet controller 7, defining a magnetic circuit with the shaft which they surround spaced from the shaft by an air-gap 8. A sensor 9 detects variations in the air gap and signals the magnet controller to vary the coil currents together or relative to each other. The Figure also shows in sectional elevation a third embodiment of journal bearing arrangement 220 which forms a back-up bearing arrangement to the magnetic bearing. The back-up bearing arrangement shares many components with the arrangement 120 and these are given the same reference numbers and not described again in any detail. Other components above have substantial correspondence with those described above and in general, have numbers with a leading "2".

The back-up bearing is arrangement is distinguished principally by the inclusion of back-up control means 282 operable to determine the level of separate support for the shaft and to vary the operating gap between the bearing pads and shaft by means of the pad stop means 245 as a function of confidence in said level of separate support, the pad stop means being displaceable relative to the housing surface so as to vary the magnitude of the operating gap.

As described above, the pad stop means comprises between each pair of adjacent bearing pads, such as $130_1$ and $130_2$ a restraining boss such as $250_1$ which has a head $152_1$ recessed to accommodate and effect restraining abutment with shoulders at the end regions of the pads. Whereas in the bearing arrangement 120 the comparable restraining boss $150_1$ is fixed to the housing, in this embodiment the restraining boss $250_1$, and each other boss $250i$, is mounted on a column $253_1$ and, within a mounting bush $253'_1$, translatable relative to the housing along a radial axis.

The back-up control means 282 further comprises actuation means 283 coupled to the columns of the restraining bosses to effect radial translation of said restraining bosses simultaneously, taking the form of ring means 284 extending circumferentially about the hosing and axially displaced from, but adjacent to, the array of restraining boss columns and mechanical coupling means 285 between each said boss column and the ring operable to transfer circumferential rotation of the ring into radial motion of each said restraining boss. The ring means comprises a pair of substantially flat annular rings $284_A$, $284_B$ sandwiching the restraining boss columns of the array and the mechanical coupling means comprises an axial projection from one to the other engageable in a slot inclined with respect to the circumferential and radial directions, forming a cam and cam follower pair whereby displacement of the ring in one circumferential direction effects displacement of all of the restraining bosses in one radial direction. For each restraining boss column $253_1$, the axial projection is formed by a bolt 285' extending, along an axis parallel to housing axis 125, through the column 253 and slots $286_A$, $286_B$ respectively in each of the adjacent rings $284_A$, $284_B$. It will be seen that the ring means 284 is supported with respect to the housing means by said mechanical coupling with the individual restraining bosses.

The actuation means 283 further comprises a relatively reciprocal piston and cylinder arrangement 287, operably coupled tangentially to the rings of the ring means at 287' to effect a rotational motion of the ring means circumferentially with respect to the housing, as well as a controller circuit 288 which is arranged to receive signals from the magnetic bearing air gap sensor 9 and, by comparison with pre-programmed or "learned" relationships between air gap variation and lack of magnetic bearing control stored in memory 288', to provide an actuating signal to the piston and cylinder arrangement 287, to effect rotation of the ring means and drive the pad stop restraining bosses radially inwardly such that the back-up bearing pads contact the shaft surface or at least reduce the distance it has to displace to become supported. That is, if the magnetic bearing is still functioning but the level of confidence in it falls, the back up bearing pads may be moved towards the shaft surface in case it does fail, but not contact the shaft until then. However if failure of the magnetic bearing is detected, possibly directly from magnet controller 7, the back-up bearing controller may displace the bearing pads to contact the shaft without delay.

If the bearing pads are to be brought to contact the shaft and, in effect, form a primary bearing, the external control as provided by the back-up control means may be employed with fluid supply means, indicated at 290, and including ducts 292 through the pads, to provide lubricant when the bearing pads are moved to contact the shaft. As such contact only occurs in conjunction with an awareness of shaft position from external signals, the bearing pad material need not be dry-lubricated and may be of any suitable material that requires a separately supplied lubricant or a of non-lubricated material that requires a coolant.

As mentioned above in relation to the first embodiment, ducts such as 292 may be employed when the pads are retracted away from the shaft to admit a gas to effect cooling and/or gas damping in addition to the friction and spring damping, and such ducts and cooling gas may be employed with the bearing arrangement 120 in like manner, although not specifically illustrated.

It will be appreciated that the piston and cylinder arrangement 287 may supply a pulsating force to effect shaft contact periodically to enhance damping, and insofar as the restraining bosses are translatable by an externally applied force, they also react against it and to this end the fluid circuit of the piston and cylinder arrangement may effect additional resilience and/or damping of any periodic elements of such reaction in line with the shaft displacement but effecting also control by other bearing pads at circumferential positions out of phase with such displacement.

It will also be appreciated that insofar at the back-up bearing is able to function when the bearing pads are displaced to fully contact the shaft as a primary bearing, the construction of the second embodiment 120 may be employed as a primary support bearing by omission of the gap, the resilient mounting of the pads and circumferential linking being able to provide damping in response to rotation eccentricity of the shaft.

In the bearing arrangements 120 and 220 the stop means 145 takes the form of inter-pad restraining bosses recessed such that the pad end shoulders $146'_i$ and $146''_i$ effect abutment therewith to define limits of displacement both away from and towards the housing surface, that is, by way of shoulder surface $147'_i$, $47''_i$ and further surface $148'_i$, $148''_i$ respectively. It will be appreciated that insofar as bearing pads are each mounted, albeit loosely, upon a spring mounting spigot $160_i$, such spigot may effect limiting of displacement towards the housing surface, as many abutment of the pad and underlying spring stack. Thus, as illustrated schematically in FIG. 9, the restraining bosses $150'_i$ may each take a form more similar to that of embodiment 20 but wherein each head $152'_i$ is tapered to provide the cam surface 167. Accordingly, each bearing pad $130_i$ may have its shoulder region $146'_i$ with only one cam follower surface $147'_i, 147''_i$.

It will be appreciated that other constructional features shown only in any one of the embodiments may be employed comparably in the other embodiments where appropriate.

The invention claimed is:

1. A journal bearing arrangement for a rotatable shaft comprising:
    (i) a housing configured to surround a shaft space and having a housing surface facing into the shaft space,
    (ii) a plurality of arcuate bearing pads arrayed about the shaft space overlying the housing surface, each having a bearing face adjacent the shaft space and a body face adjacent the housing surface, and
    (iii) a mounting arrangement, arranged to support at least one bearing pad with respect to the housing surface movable relative thereto in a direction to and from the housing surface, including associated with each said movable pad, a stop comprising a restraining boss and a shoulder provided one each by the housing and bearing pad, said boss having a head portion arranged to overlie the shoulder to limit the extent of pad movement away from the housing surface and permit displacement of the bearing pad towards the housing surface, and a spring arrangement comprising, a plurality of individually deflectable resilient elements operable to bias the pad away from the housing surface to the limit imposed by the stop and exert on said pad stopped by the stop a predetermined level of pre-load and, in response to load applied to the bearing surface exceeding said pre-load level, permit displacement of the pad towards the housing surface.

2. A journal bearing arrangement as claimed in claim 1 in which the mounting arrangement includes, associated with at least one said movable bearing pad, at least one support peg secured at one end of the peg with respect to one of the pad or housing and having a shank extending towards an unsecured end of the peg free to move with respect to the other one of the pad or housing, said spring arrangement comprises at least one stack of individually deflectable resilient elements arranged to bear on one another in a radial direction disposed in a state of compression between one of the pad or housing and the other one of the pad or housing, or support peg secured thereto, at least one said stack of resilient elements being apertured and associated with a support peg, disposed in co-axial relationship with the shank thereof.

3. A journal bearing arrangement as claimed in claim 1 in which the individually deflectable elements comprise annular dished washer springs and the spring means comprises at least one stack of said annular dished washer springs.

4. A journal bearing as claimed in claim 3 in which said stack comprises associated with each bearing pad at least a first spring terminating adjacent one end region of the pad and pivotally secured thereto, a second spring terminating adjacent the opposite end region of the pad and pivotally secured thereto, and a third spring mounted at its centre on a spigot extending along a radial axis and constrained by the spigot to sliding motion along the spigot and in respect of displacement from the housing surface.

5. A journal bearing as claimed in claim 1 in which the individually deflectable resilient elements comprise leaf springs extending circumferentially with respect to the housing and shaft space, and the spring arrangement comprises, associated with each bearing pad between the pad and the housing surface a stack of said leaf springs arranged to bear one on another in a radial direction.

6. A journal bearing arrangement as claimed in claim 1 in which the mounting includes a damper defined by the spring arrangement responsive to displacement of any particular bearing pad by rotation eccentricity of the shaft within the shaft space to reduce the return of energy from the spring means to the shaft substantially in phase with the eccentric rotation.

7. A journal bearing arrangement as claimed in claim 6 in which the damper comprises friction damping means operable to effect Coulomb damping between relatively sliding, abutting surfaces of the spring arrangement.

8. A journal bearing arrangement as claimed in claim 6 in which the damper is arranged to provide different damping at different circumferential positions about the shaft space.

9. A journal bearing arrangement as claimed in claim 1 in which the spring arrangement is arranged to provide at least one of spring rate and pre-load varying as a function of pad position about the shaft space.

10. A journal bearing arrangement as claimed in claim 1 in which the stop associated with each said movable bearing pad comprises at least one pair of shoulders spaced apart at opposite edges of the pad, each shoulder having a surface facing towards the shaft space and rebated with respect to the bearing surface, and associated with each said shoulder a said restraining boss extending from the housing surface adjacent said pad edge having a head portion disposed to overlie the shoulder.

* * * * *